United States Patent [19]

Bloxsom

[11] 4,285,331
[45] Aug. 25, 1981

[54] SOLAR HEATER

[76] Inventor: Dan E. Bloxsom, 22 E. Shady La., Houston, Tex. 77042

[21] Appl. No.: 959,993

[22] Filed: Nov. 13, 1978

[51] Int. Cl.³ .............................................. F24J 3/02
[52] U.S. Cl. .................................. 126/428; 126/430; 126/431; 126/450; 165/48 S
[58] Field of Search ............... 126/416, 415, 429, 436, 126/449, 451, 428, 430, 437, 450, 417, 431; 165/48 S

[56] References Cited

U.S. PATENT DOCUMENTS

| 965,391 | 7/1910 | Little | 126/436 |
|---|---|---|---|
| 3,299,881 | 1/1967 | Koch | 126/416 |
| 3,894,685 | 7/1975 | Keyes et al. | 126/429 |
| 3,957,109 | 5/1976 | Worthington | 126/429 |
| 4,029,081 | 6/1977 | Strong | 126/429 |
| 4,081,024 | 3/1978 | Rush et al. | 126/436 X |
| 4,112,919 | 9/1978 | Davis | 126/429 |
| 4,147,157 | 4/1979 | Zakhariya | 126/419 |
| 4,148,293 | 4/1979 | Lents et al. | 126/429 X |

FOREIGN PATENT DOCUMENTS 236337 11/1961 Australia ................................ 126/415

OTHER PUBLICATIONS

Solar Prop Electricity from the Sun, Published by P & S Engineered Plastics, Inc.

Primary Examiner—James C. Yeung
Assistant Examiner—Larry Jones
Attorney, Agent, or Firm—Murray Robinson; Ned L. Conley; William E. Shull

[57] ABSTRACT

A solar heater for heating room air or home hot water includes a transparent plastics material arched panel set over an opening in a roof with air inlet passages between the roof and panel around the periphery of the panel, a sheet metal pan under the roof opening having an inlet and outlet for water and filled with lava rock and water, a ceiling opening just beyond one end of the tray, a register controlling the flow of air through the opening, and a plurality of solar powered electric motor driven fans under the panel over the ceiling just beyond the other end of the tray adapted to draw air in from outside the panel and blow it over the rock, which has been heated by the sun, and down through the ceiling opening into the room below. If there is no need for heating, register is closed and valve in water line is opened to heat water flowing through the pan and rocks.

10 Claims, 4 Drawing Figures

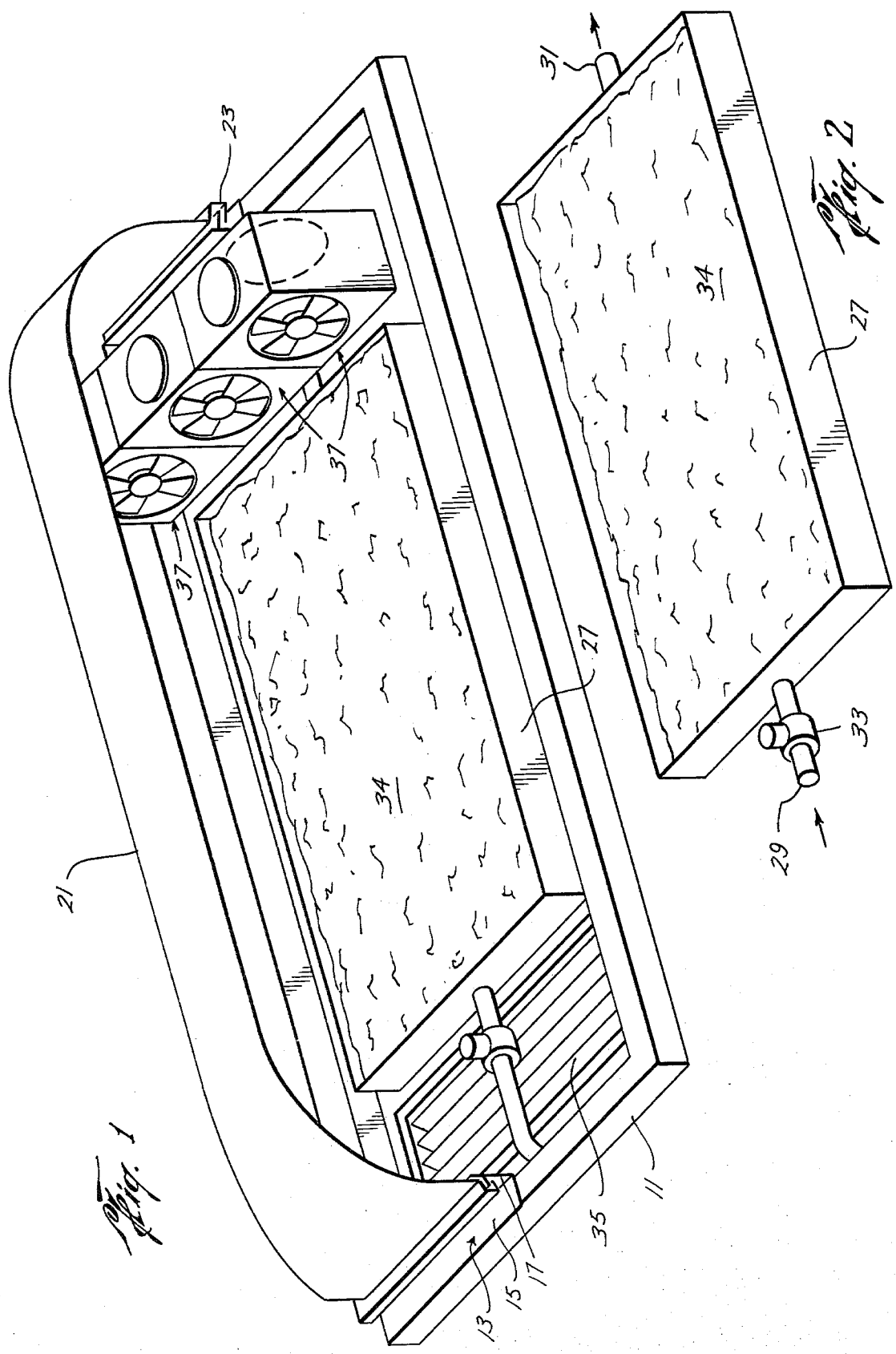

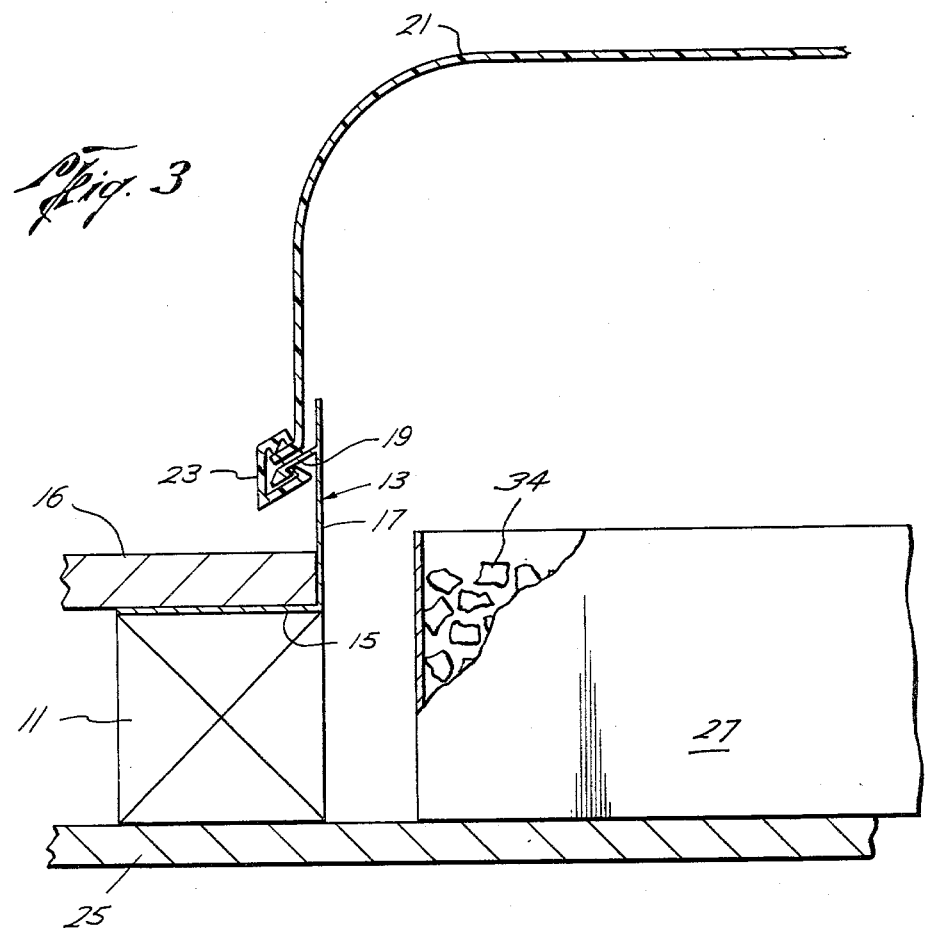
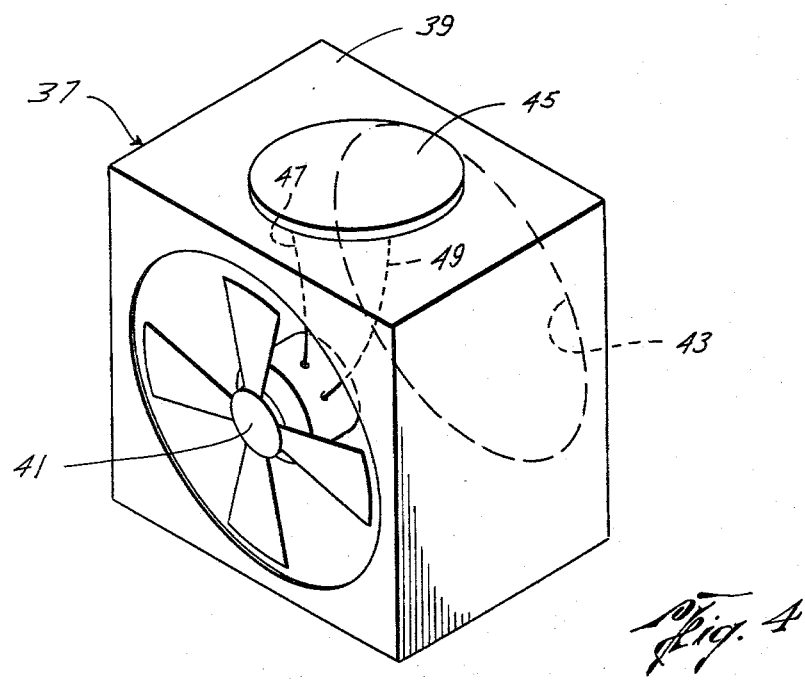

SOLAR HEATER

BACKGROUND OF THE INVENTION

This invention relates to a combination room air and home hot water heater employing solar energy both for fluid heating and to power a fan motor for forced draft.

Various elements employed in the invention have previously been known. For example, the transparent vented roof panel has been used as a skylight and is described in a leaflet entitled "Low Silhouette Posi Lock Self Flashing SPACELITE" published by Southwestern Plastics, Inc. of Houston, Tex. Applicant's patented lock is used to secure the panel to the roof. The solar powered electric motor driven fans are described in a brochure entitled "Solar-Prop Electricity From The Sun" published by P & S Engineered Plastics, Inc. of Knoxville, Tenn. Ceiling registers are known in conventional central hot air heating systems. Lava rock is a well known light aggregate.

A variety of solar water heaters are known as described in my contemporaneous United States patent application entitled "Solar Energy Collector".

In prior home hot air heating systems, circulation of air over the heat exchanger to draw heat from the energy source (burning gas, oil, coal, or electricity) has been accomplished either by natural gravity circulation or by means of a fan consuming electric power supplied by the utility company. Air circulation has therefore been either inefficient or costly.

SUMMARY OF THE INVENTION

According to the invention solar energy is used both to supply heat to the heat exchanger and power a fan to provide forced draft to circulate air past the heat exchanger. The apparatus is also convertible to hot water heating when not required for room air heating.

BRIEF DESCRIPTION OF THE DRAWING

For a detailed description of the invention reference will now be made to the accompanying drawings wherein FIG. 1 is a pictorial view of apparatus embodying the invention, FIG. 2 is a pictorial view of the heat exchanger unit employed in the invention;

FIG. 3 is a fragmentary section through the transparent roof panel; and

FIG. 4 is a pictorial view of one of the solar fans employed in the invention.

DESCRIPTION OF PREFERRED EMBODIMENT

Referring to FIGS. 1–3, there is shown wood frame 11 around the inner periphery of an opening in a roof. Sheet metal flashing 13 has a lateral flange 15 overlying the frame 11 and is secured thereto, e.g. by nails. Roof shingles 16 extend over flange 15. The flashing has a vertical flange 17 extending upwardly from the lateral flange adjacent the inner periphery of the frame. A lip 19 extends outwardly from flange 17. Transparent, plastics material panel 21 supports a peripheral channel 23 thereabout which snaps over lip 19 to hold the panel in place over the dome. The channel is not sealed to the lip and does not make a tight fit therewith so that a passage for the inflow of air is left around the periphery of the panel.

Ceiling 25 extending beneath the roof opening supports a sheet metal pan 27 having an impervious bottom, side walls, and ends, so as to hold water. A water inlet pipe 29 is provided at one end and a water outlet 31 at the other. Inlet 29 is controlled by valve 33. Pipe 29 may, for example, be connected to the bottom of a hot water tank and pipe 31 connected to the top of the tank, to provide supplemental heat to water in the tank.

The tank will ordinarily have its own regular heating system, the pipes 29, 31 merely being mere parts of an auxiliary heating system.

Pan 27 is covered with crushed lava rock 34 or other porous light weight heat absorbing aggregate. In addition, pan 27 is filled with water around the rock. The rock absorbs heat from the sun's radiation passing through panel 21 and transfers it to the water. Pan 27 and rock 33 thus form a heat exchanger to transfer heat to the water in the pan.

Valve 33 is closed when it is desired to use the apparatus for room air heating. In such case register or air valve 35 in the ceiling between one end of the pan and one end of frame 11 is opened. Then solar powered electric motor driven fans 37 draw air in through the air passages around the periphery of the panel and force it along over the lava rock and water, causing the air to be heated. The hot air discharges downwardly through register 35 into the room. The lava rock is heated by the sun's radiation passing through panel 21 and together with the water (if the pan is full of water) serves as a heat exchanger.

When the room becomes sufficiently heated, register 35 may be closed and valve 33 is opened to resume water heating.

Referring now to FIG. 4, each of fans 37 comprises a plastic box 39 having an electric motor driven fan 41 set in an opening in its front face. An opening 43 in the back of the box admits air to the fan. A solar cell 45 in the top of the box supplies direct current to the fan motor via wires 47, 49. Fan 37 may be of the type described in the aforementioned P & S Engineered Plastics, Inc. brochure, the description thereof being incorporated herein by reference.

While a preferred embodiment of the invention has been shown and described, modifications thereof can be made by one skilled in the art without departing from the spirit of the invention.

I claim:

1. Solar heater for a structure having a roof and a ceiling extending beneath such roof, comprising an arched panel mounted in an opening in such roof, said panel being transparent to solar radiation and including an air inlet means, a heat exchanger disposed on and supported by such ceiling, said heat exchanger including means for absorbing heat from such solar radiation and being adjacent and spaced from the panel, solar powered means disposed on and supported by such ceiling under said panel in a location to receive some of such solar radiation for moving air over the heat exchanger in the space between said panel and said heat exchanger to absorb heat from said heat exchanger, and a register disposed in an opening in such ceiling movable between an open position in which air is allowed to pass from said solar heater through such ceiling and a closed position in which air is prevented from passing from said solar heater through such ceiling.

2. Heater according to claim 1, said heat exchanger comprising a bed of rock supported beneath the panel.

3. Heater according to claim 2, said rock being supported in a pan, said pan having a water inlet and a water outlet and being adapted for flow of water from said water inlet, over said bed of rock and out said water outlet.

4. Heater according to claim 3, said rock being crushed porous light weight aggregate.

5. Heater according to claim 4, said aggregate being lava rock, said pan containing water about said lava rock, at least one of said water inlet and outlet being provided with a valve movable between a first position allowing such flow of water and a second position preventing such flow of water, said heater operating as a room air heater when said register is in said open position and said valve is in said second position and as a water heater when said register is in said closed position and said valve is in said first position.

6. Heater according to claim 1, said an inlet means including an air inlet passage extending completely around said panel at the periphery of said panel and wherein said register is disposed adjacent the heat exchanger.

7. Heater according to claim 6, said register being disposed adjacent one part of the heat exchanger and said means for moving air being disposed adjacent an opposite part of the heat exchanger.

8. Solar heater for a structure having a roof and a ceiling extending beneath such roof, such ceiling having an opening therein, such roof having an opening therein over such opening in such ceiling, such opening in such roof having sheet metal flashing disposed around its inner periphery, such flashing having an upwardly extending flange and an outwardly, downwardly extending lip on such flange, comprising:

- an arched panel mounted over such opening in such roof, said panel being transparent to solar radiation and having an inwardly, upwardly facing channel around its periphery, such lip on such flange being received in said channel, there being an air inlet passage between said channel and such lip;
- a pan having impervious side walls, end walls and bottom disposed on such ceiling under and spaced from said panel, said pan having a water inlet at one of its ends and a water outlet at the other of its ends, at least one of said water inlet and water outlet having a valve;
- a bed of crushed, porous light weight aggregate disposed in said pan;
- a solar powered fan disposed on such ceiling under and spaced from said panel at one end of said pan, said fan being adapted for blowing air over said pan and said bed; and
- a register mounted in such opening in such ceiling at the other end of said pan, said register being adapted for alternately preventing or allowing the passing of air from said heater through such opening in such ceiling.

9. Heater according to claim 8, said aggregate being lava rock.

10. Heater according to claim 9, there being water in said pan covering said lava rock.

* * * * *

UNITED STATES PATENT AND TRADEMARK OFFICE
CERTIFICATE OF CORRECTION

PATENT NO. : 4,285,331
DATED : AUGUST 25, 1981
INVENTOR(S) : DAN E. BLOXSOM

It is certified that error appears in the above—identified patent and that said Letters Patent is hereby corrected as shown below:

Column 2, line 15: change "33" to --34--.

Column 3, line 16: change "an" to --air--.

Signed and Sealed this

Ninth Day of February 1982

[SEAL]

Attest:

GERALD J. MOSSINGHOFF

Attesting Officer    Commissioner of Patents and Trademarks